April 21, 1925.  
J. C. PORTER  
INSECT AND NEST DESTROYER  
Filed Nov. 23, 1923
1,534,734
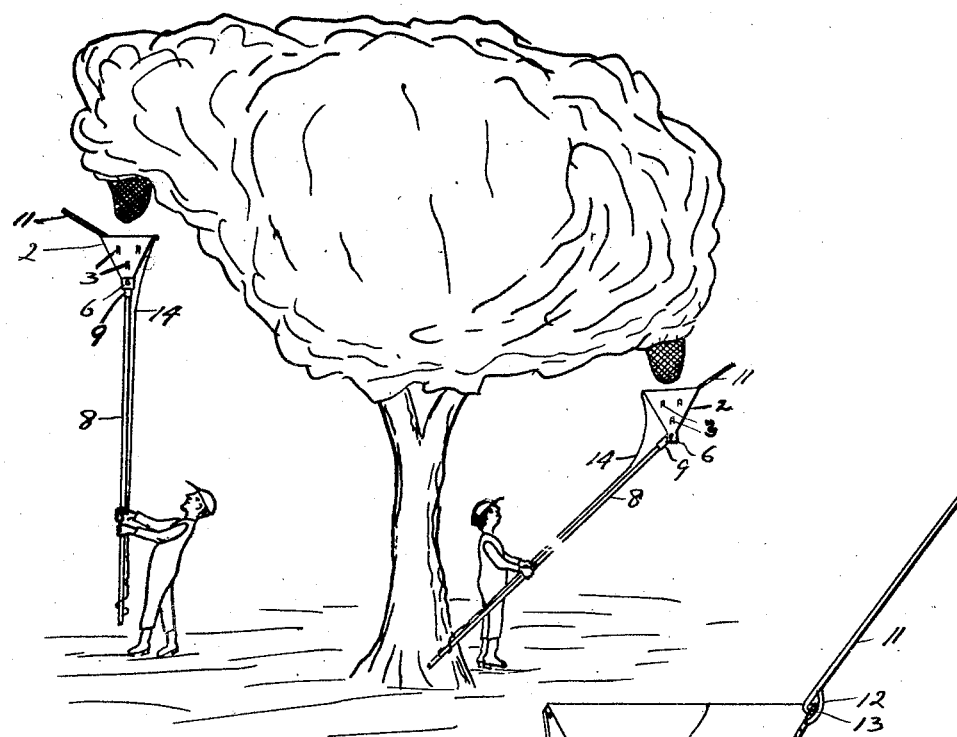
Fig.1.
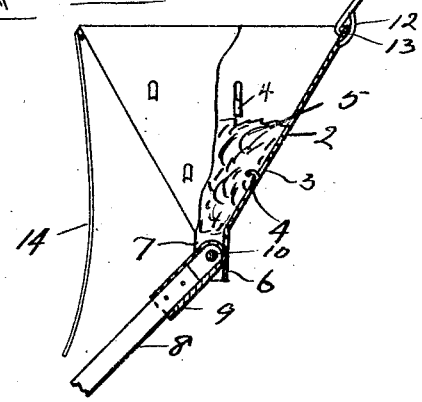
Fig 2
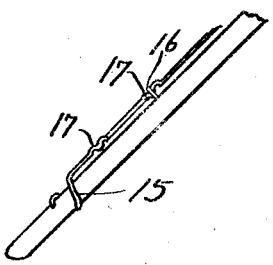
INVENTOR  
John C. Porter  
By W. W. Williamson Atty.

Patented Apr. 21, 1925.

1,534,734

UNITED STATES PATENT OFFICE.

JOHN C. PORTER, OF WOODSTOWN, NEW JERSEY.

INSECT AND NEST DESTROYER.

Application filed November 23, 1923. Serial No. 676,505.

*To all whom it may concern:*

Be it known that I, JOHN C. PORTER, a citizen of the United States, residing at Woodstown, in the county of Salem and State of New Jersey, have invented new and useful Improvements in an Insect and Nest Destroyer, of which the following is a specification.

My invention relates to new and useful improvement in an insect and nest destroyer, and has for its primary object to provide an exceedingly simple and effective device of this character consisting of a holder for suitable absorbent material, said holder being hinged to a pole whereby the former may be set in different positions relative to the latter, said holder also being provided with a cover adapted to be closed during the cremation of the insects and the burning of the nest.

Another object of my invention is to provide a simple and effective means for moving the holder to its different positions and holding the same in either of its adjusted positions.

A further object of the invention is to provide the holder with air vents or draught openings and to utilize the metal cutaway during the formation of the vent openings as retaining hooks or prongs for the absorbent material.

A still further object of the invention is to provide an armor for the upper end of the pole to prevent the same from being burned as the absorbent material is consumed.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawing forming a part of this application, in which:—

Fig. 1, is a view showing the manner in which my device is used and illustrating it in two different positions.

Fig. 2, is an enlarged sectional side elevation of the device illustrating the holder in one position with the cover open.

In carrying out my invention as here embodied, 2 represents the holder which is of inverted conical or funnel shape providing upwardly flaring walls in which are formed draught or vent openings 3 and the metal cut out to form these openings is not completely severed from the metal wall but is bent inward to form retaining prongs 4 to hold the absorbent material 5, such as absorbent cotton, in the holder.

The lower smaller end of the holder is provided with a hollow shank 6 open at its upper and lower ends and provided with a slot 7 at one side. Within this shank is pivoted the pole 8 preferably by means of a metal ferrule 9 which encloses the upper end of the pole to act as an armor therefor and when so constructed a pin 10 passes through the walls of the shank and ferrule to act as the pivoting means. The wall of the shank directly opposite the slot 7 acts as a stop when the holder is positioned in endwise alignment with the pole, as shown at the left hand side of Fig. 1, by engaging the pole as will be obvious.

To the upper edge of the holder is hinged a cover 11, as at 12, and is provided with a stop 13 which will engage the outer surface of the holder when the cover is opened and when said cover is in an open position it has passed a vertical line through its hinge to prevent it from accidentally closing while in use, or in other words, when open said cover is inclined outwardly from the holder. It is preferred that when said cover is closed it will not tightly seal the mouth of the holder and therefore sufficient space will remain between the cover and holder to permit of a circulation of air through the holder.

To the upper edge of the holder and on the same side as the slot 7 is attached one end of a pull member 14 preferably in the form of a wire the major portion of which runs alongside of and parallel to the pole 8 and if found desirable the opposite end may be coiled about the pole as at 15 so as to slide up and down thereon. By moving this pull member in different directions the holder may be adjusted to a position in endwise alignment with the pole or caused to assume a position at an angle thereto as shown in Fig. 2, and if found desirable some suitable means may be utilized for retaining the holder in its different adjusted positions, such means being here shown, as comprising a staple 16 carried by the pole through which the pull member 14 passes the latter having notches 17 for registration with the staple and where the member is made of wire these notches are produced by corrugating said wire at different points.

In practice the absorbent material 5 in the holder 2 is saturated with a suitable inflammable substance, such as kerosene oil, and then lighted and the cover 11 closed which will cause the oil to burn slowly due to the limited draught through the vents 3 and the open spaces between the mouth of the holder and its cover. Next the holder is adjusted to either of its two positions by moving the pull member 14 after which by a short quick movement of the entire device the cover 11 may be opened and the holder positioned directly beneath the insects or insect nest which it is desired to destroy. As soon as the cover 11 is opened more air can enter the interior of the holder producing greater combustion so that flames of considerably length are produced which will cause the nest or the insects to drop into the holder and by another short quick movement the cover may be closed and since the oil continues to burn the insects will be cremated and the nest completely burned.

Of course I do not wish to be limited to the exact details of construction as herein shown as these may be varied within the limits of the appended claims without departing from the spirit of my invention.

Having thus fully described my invention, what I claim as new and useful is:—

1. In a device of the character stated, the combination of a pole, a funnel shaped holder pivoted to an end of said pole with the larger end of said holder uppermost, said holder having vents therein, a cover hinged to said holder for closing the mouth thereof, means attached to the holder and having a portion paralleling the pole whereby the holder may be set in different positions, and means associated with said last named means and the pole whereby the holder may be held in its different adjusted positions.

2. In a device of the character stated, a pole, a funnel shaped holder connected with said pole, said holder having portions of its wall partially cut therefrom and bent inward to produce retaining prongs, the formation of said prongs producing air vents, and a cover hinged to the mouth of said holder.

3. An insect and nest destroyer comprising, in combination, a pole, a ferrule attached to and enclosing one end of said pole, a funnel shaped holder having portions of its walls partially cut out and bent inward to provide retaining prongs and produce air vents, a shank provided with a slot for the reception of the ferrule, means to pivot said shank to the ferrule, said slot permitting the holder to be positioned at an angle to the pole, a pull member attached to the upper end of the holder and having a portion paralleling the pole whereby the holder may be moved into different positions, said pull member having spaced notches therein, a staple carried by the pole through which the pull member passes and with which the notches register to retain the holder in different adjusted positions, a cover hinged to the upper end of the holder, means for limiting the opening movement of said cover and an absorbent material within the holder for saturation with an inflammable substance, said absorbent material being held against accidental displacement by the retaining prongs.

In testimony whereof, I have hereunto affixed my signature.

JOHN C. PORTER.